United States Patent [19]
Daugherty et al.

[11] 3,873,264
[45] Mar. 25, 1975

[54] BOTTLE COATING SENSITIZER AND METHOD THEREOF

[75] Inventors: Barney R. Daugherty, Elmira Heights; John R. Letawa, Horse Heads, both of N.Y.

[73] Assignee: Dart Industries Inc., Los Angeles, Calif.

[22] Filed: Mar. 4, 1974

[21] Appl. No.: 448,095

[52] U.S. Cl. .................. 432/18, 156/18, 156/467, 156/468, 432/77, 432/85
[51] Int. Cl. ................. F23d 13/26, F23d 13/36
[58] Field of Search ............ 432/10, 11, 18, 77, 85; 156/18, 497, 498

[56] References Cited
UNITED STATES PATENTS
2,928,666   3/1960   Distler .................................. 432/85
3,048,380   8/1962   Burke et al. ......................... 432/10
3,076,640   2/1963   Dubuit ................................. 432/11
3,578,536   5/1971   Peck et al. ........................... 156/498
3,788,917   1/1974   Linda .................................. 156/497

Primary Examiner—John J. Camby
Attorney, Agent, or Firm—Kenneth J. Hovet; Leigh B. Taylor; Paul R. Wylie

[57] ABSTRACT

A system for improving the adhesion of labels to plastic coated bottles including a series of nozzles discretely aligned to disperse a flame over the outer surfaces of a bottle moving on a conveyor. An inline bottle cooling station is also provided comprising an endless porous belt operating in conjunction with a water spray. The bottles are initially spaced apart a predetermined distance on the conveyor, passed by the flame nozzles, and subsequently cooled with a porous belt and water spray assembly.

14 Claims, 9 Drawing Figures

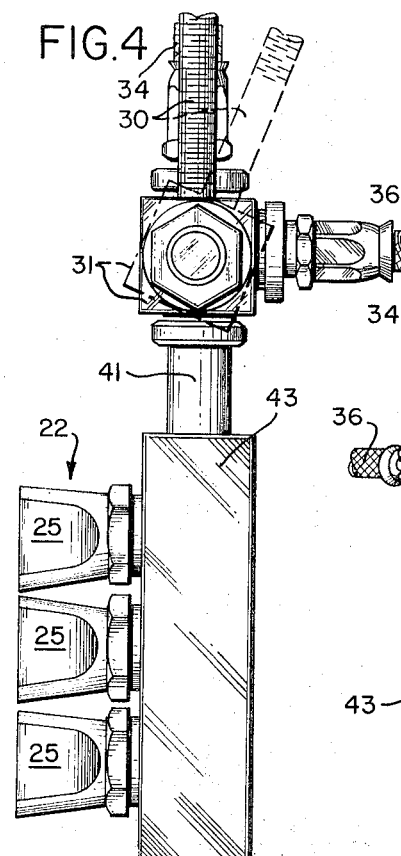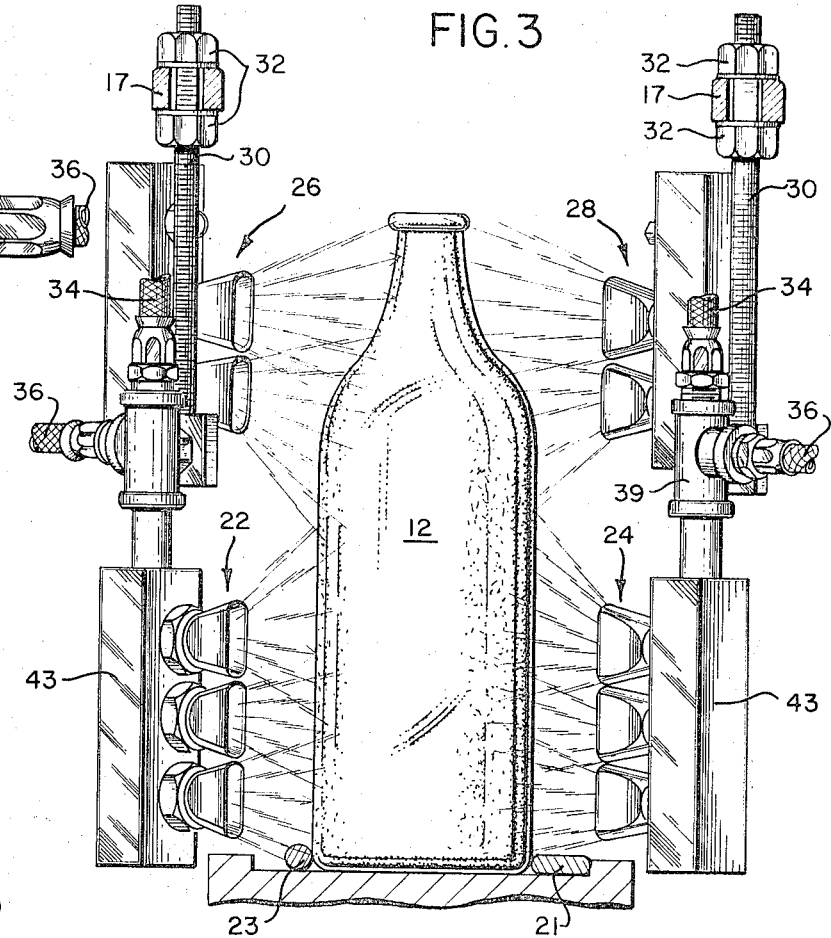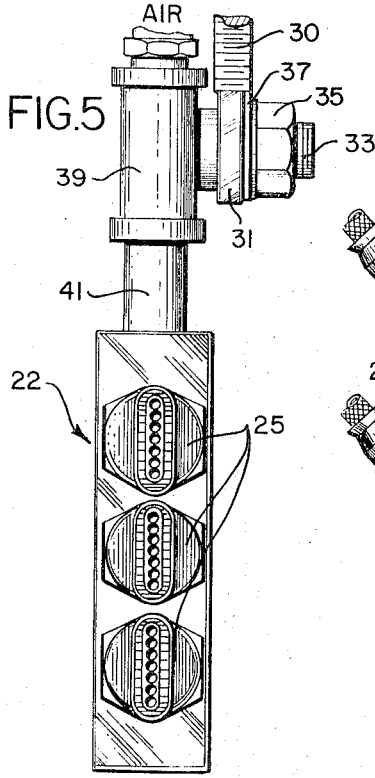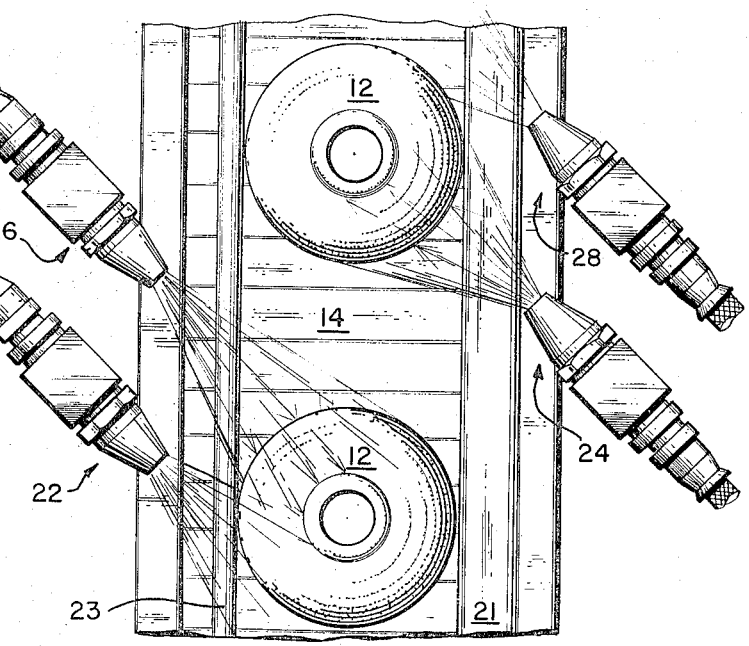

3,873,264

BOTTLE COATING SENSITIZER AND METHOD THEREOF

BACKGROUND OF THE INVENTION

1. Field of the Invention

The present invention relates to means for enhancing the adhesion of labels to a bottle and, more particularly, to a flame treatment system for sensitizing the outer surfaces of a bottle for improved label adhesion.

2. Description of the Prior Art

Because of the somewhat torturous route between the bottler and/or manufacturer and consumer the firm adherence of the label to a package, bottle or container has been the subject of frequent serious investigation. Various techniques have been utilized to improve the adhesion of advertising labels, content descriptions, etc. to the outer surfaces of a container. Some of these techniques utilize chemical pre-treatments or etching to effect a proper adhesive surface. Others abrade the container surfaces, or use chemical etching, grit blasting or other means known in the art for roughing the surfaces. The problem with these prior art techniques are that they are time consuming and expensive since to be economical they require the recovery or the use of various corrosive chemicals, etching compounds or abrading materials. In the case of abrading the adhesive surfaces with grinding wheels or steel brushes, the machinery to accomplish such on a mass production basis renders such techniques undesirable. A further problem is that only the area where the label is to be applied should be abraded or conditioned for the attachment of a label. This becomes extraordinarily complicated and results in expensive unreliable equipment. Additionally, such techniques require the subsequent placement of a label over the exact area that had been treated. This leads to a large number of rejects in attempts to provide attractive containers. The most desirable solution to the above problems would be to provide a system that does not require large capital investment in precision machinery and will not slow down the high volume production line and further will not require any precise positioning of the labels on the containers.

SUMMARY OF THE INVENTION

In accordance with the present invention there is provided a system for treating the surfaces of containers to facilitate the firm adhesion of labeling materials thereto. The system comprises transportation means for moving and sequencing containers, a flame treatment station for sensitizing the container surfaces, and a cooling station for returning the containers to ambient temperature after the flame treatment. The transportation means includes a sequencing assembly for setting apart the containers on the conveyor means a predetermined distance for the appropriate timed sequential treatments thereof. The flame treatment station includes a series of discretely aligned nozzles for dispersing a flame toward the outer surfaces of the container as it passes therethrough. The cooling station is located downstream of said flame treatment station and comprises a water spray and a porous endless belt which operates in conjunction with an opposing support means to cause the container to be contacted with cooling water upon substantially all surfaces as they travel through the station.

BRIEF DESCRIPTION OF THE DRAWINGS

FIG. 3 is a side elevational view of opposing banks of flame burners of the flame treatment station looking in the direction of travel of a container through the system;

FIG. 4 is a fragmentary side elevation view of the lower set of flame nozzles shown in FIG. 3;

FIG. 5 is a fragmentary front elevation view of the nozzles in FIG. 4;

FIG. 6 is a fragmentary plan view of FIG. 3 showing the alignment of flame nozzles in the flame treatment station relative to containers moving therethrough;

DESCRIPTION OF THE PREFERRED EMBODIMENT

Figure 1:
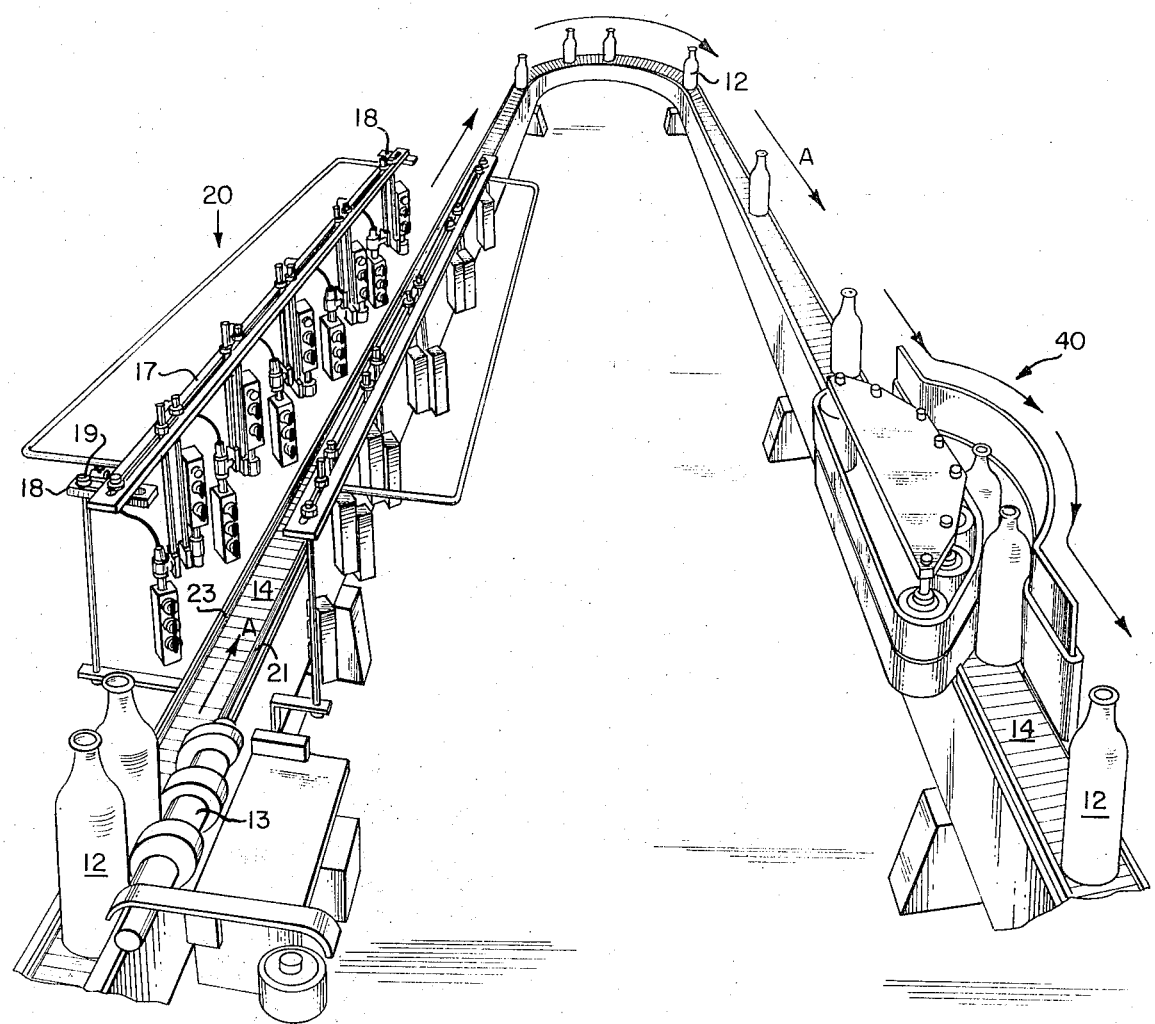
FIG. 1 is a perspective view of the container sensitizing system of the present invention.

Referring now to the drawings, and more particularly to FIG. 1 thereof, there is shown a container sensitizing system constructed in accordance with the teachings of the present invention. The system comprises a container sequencing device shown generally as 10, a flame treatment station shown generally as 20, and a water cooling station shown generally as 40. Containers 12, shown in FIG. 1 at various locations throughout the system, are transported into and out of the system on a conveyor means 14. The conveyor is shown as having a series of flights upon which the containers rest, however, belt means, tray means, or other conveying devices known in the art could work equally as well. The arrows labeled A in FIGS. 1, 3, 7 and 10 show the direction of travel of the bottles through the system in a continuous manner.

Figure 2:
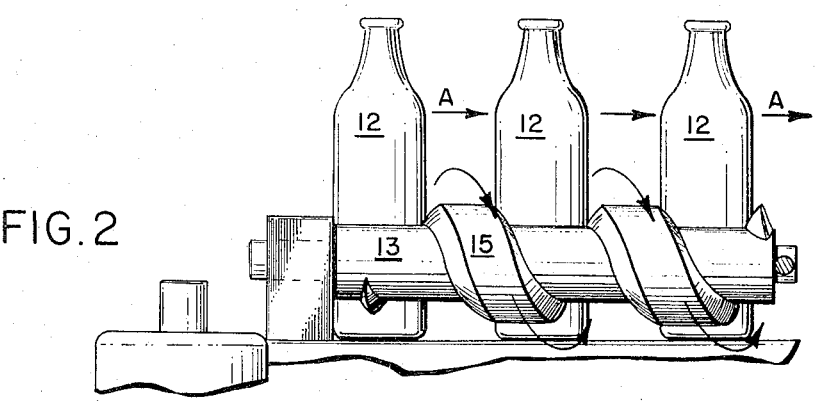
FIG. 2 is a fragmentary side view of the container sequencing means showing the movement of containers therethrough.
Figure 7:
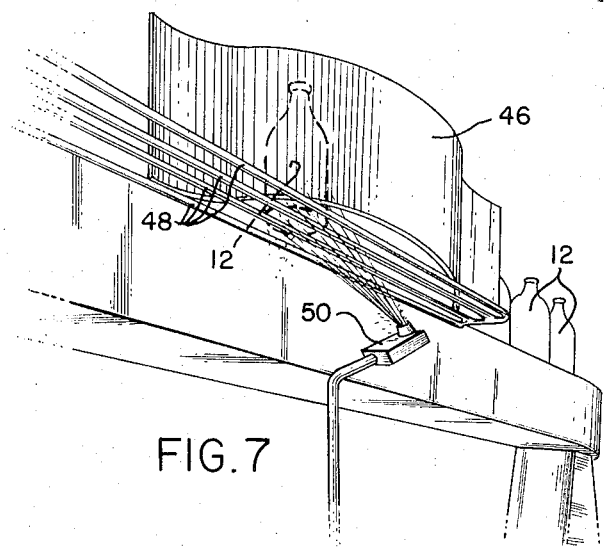
FIG. 7 is a fragmentary side elevation view of the water cooling station shown in FIG. 1.
Figure 9:
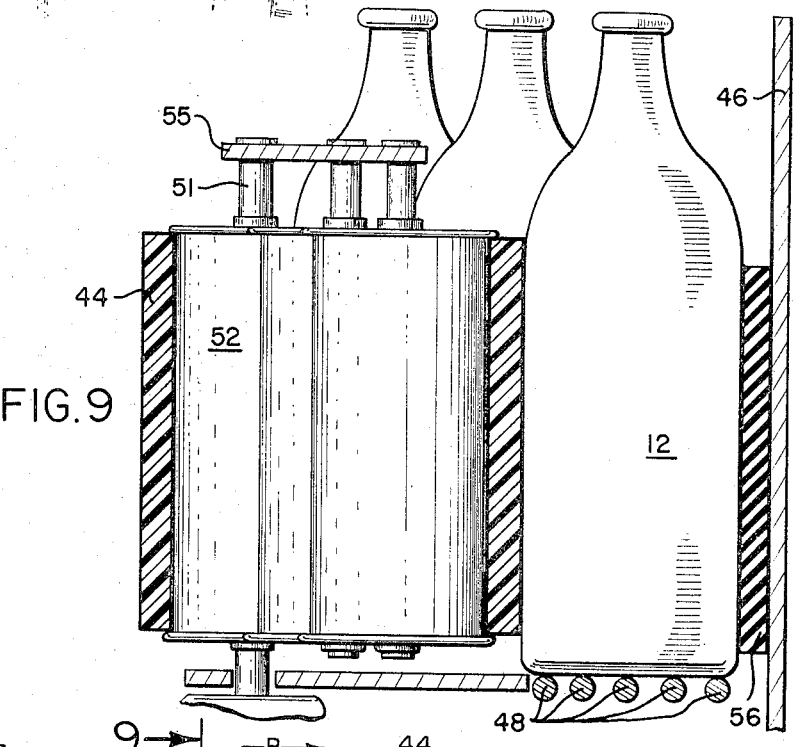
FIG. 9 is a section view taken along line 9-9 of FIG. 8.

Initially, the bottles are sequenced and spaced apart a predetermined distance by a container sequencing device shown best in FIGS. 1 and 2. The device comprises a power driven rotatable shaft 13 provided with a circumferential helical-shaped projection 15. Each revolution of the shaft will advance each container a predetermined distance approximately equal to the axial distance between each projection.

FIG. 2 illustrates the rotation of the shaft 13 and the movement of the bottles in accordance therewith. The containers are brought to the sequential timing device 10 by conveyor 14. From there their movement is controlled primarily by the speed of rotation of the shaft 13. The shaft is independently driven by motor and variable speed transmission means well-known in the art. Oftentimes, containers will come to the sequencing device in groups with each container in close contact. The device operates to take one container at a time, align it on the conveyor centerline and space it a predetermined distance from the preceding container. The distance is set by the rotational speed of the shaft relative to the conveyor speed. If the shaft and helical-shaped abutment means 15 move the containers slower than the speed of the conveyor, the conveyor flights will slide under the container until released from the operation of the device.

It is to be understood that the purpose of this system is to prevent jam-ups of containers and to space each container apart a specified distance prior to the time they are allowed to enter the flame treatment station. The spacing is an important aspect to the operation of the present invention because it allows the flames in the flame treatment station to contact all surfaces of the containers as they pass therethrough. It also prevents containers from becoming attached or adhered to each other due to the heat from the flame nozzles.

After having been spaced apart by the sequential positioning means, the containers enter the flame treatment station 20 as shown in FIG. 3. This station comprises groups of discretely located banks of flame nozzles with a first group located on one side of the conveyor and a corresponding second group located on a side of the conveyor opposite the first group for directing a gaseous flame upon the outer surfaces of the container. The lower banks of nozzles are denominated as 22 and 24 and the upper banks are denominated as 26 and 28. The lower banks include three identical burners or nozzles 25 arranged in a straight vertical row as best shown in FIGS. 4 and 5. The three nozzles are aligned angularly with respect to the longitudinal or centerline axis of the conveyor. Longitudinally offset from the lower nozzles are pairs of vertically aligned upper nozzles 26 and 28. It can be seen in FIG. 6 that nozzles 22 and 26 are aligned at an acute angle, i.e., diagonally with respect to the centerline of the conveyor whereas opposing nozzles 24 and 28 are aligned so that their axes form corresponding 180° complementary angles to the acute opposite facing angular alignment of nozzles 22 and 26. In this manner the direction of the flames from each bank of nozzles are substantially parallel but offset from each other along the direction of movement of the containers and are diagonal with the conveyor centerline. This feature of the invention together with the presence of repeating banks of flame nozzles, conveyor speed and container spacing serve to effect a uniform sensitization of the containers passing therethrough. The number of nozzle banks is discretionary, however, and is determined by the type of surface being sensitized, the degree of sensitization desired, and the size and type of labels to be applied.

Another advantageous feature of the invention that serves to effect uniform sensitization, reduce residence time, shorten the number of nozzle banks and save on fuel costs is the use of rotate bars 21 and 23 on opposite sides of the conveyor. The bars are preferably stationary and are adjustably positioned to frictionally contact lower portions of the containers as they enter the flame treatment station. In a preferred embodiment one of the rotate bars may slidingly engage the containers and simply operate to maintain each container in frictional contact with the opposing bar. This causes the containers to rotate simultaneous with their movement on the conveyor through the flame station.

To adjust the system for various sized containers or irregular shapes, each bank of nozzles is mounted on an elongated stationary frame 17. The frame is provided with a longitudinal slot 19 through which extends a threaded mounting shaft 30. The shaft is connected to slotted frame 17 by set nuts 32. Vertical alignment can readily be accomplished by adjustment of the set nuts to raise or lower the shaft and bank of nozzles. The frame 17 may be laterally adjusted by movement on horizontal support bars 18. A slot 19 is provided for this purpose.

The shaft 30 is secured to each bank of nozzles by fixedly connecting it to a rotatable ring 31. The ring is mounted on threaded stud 33 by a nut 35 and lock washer 37. By loosening the nut 35 the bank of nozzles may be rotated as shown in phantom in FIG. 5.

The stud 33 is fixedly secured to a Tee pipe fitting 39. This fitting operates to mix air from inlet 34 and gas from inlet 36 and pass the mixture through nipple 41 to header 43. The header distributes the gaseous mixture to each of the separate flame nozzles or burners referenced as numeral 25.

To facilitate alignment of the separate banks of nozzles, the gas and air inlets are provided with flexible hoses or tubing. This eliminates the necessity of repiping every time adjustments are made for various sized bottles.

In the case of sensitizing plastic containers or plastic coated bottles a gaseous mixture such as propane, butane, or natural gas with air is used to produce the flame for sensitizing the outer plastic coating. The nozzles are preferably adjusted so that the flames are a distance of 0.1 to 3 inches from the bottles. To effect the proper degree of oxidation of the plastic surface, a one to ten second exposure time has been found to be effective. Too much exposure by having the flames too close to the bottle or allowing the bottle to pass through the station too slowly would result in undesirable discoloration and even possible charing of the container surfaces. However, with the apparatus of the system of the present invention, it is a simple matter to adjust the flames, the number of flame nozzle banks and/or conveyor speed to effect the desired oxidation of the plastic coating. Additionally, the system is provided with flame detection equipment known in the art to shut off all gas flow in case of flare-ups.

After having been flame treated and/or sensitized, the bottles continue on the conveyor system a brief period to achieve an initial pre-cooling prior to reaching the water cooling station. This lessens the effects of thermal shock. Ambient air fans (not shown) may optionally be used for this purpose.

Figure 8:
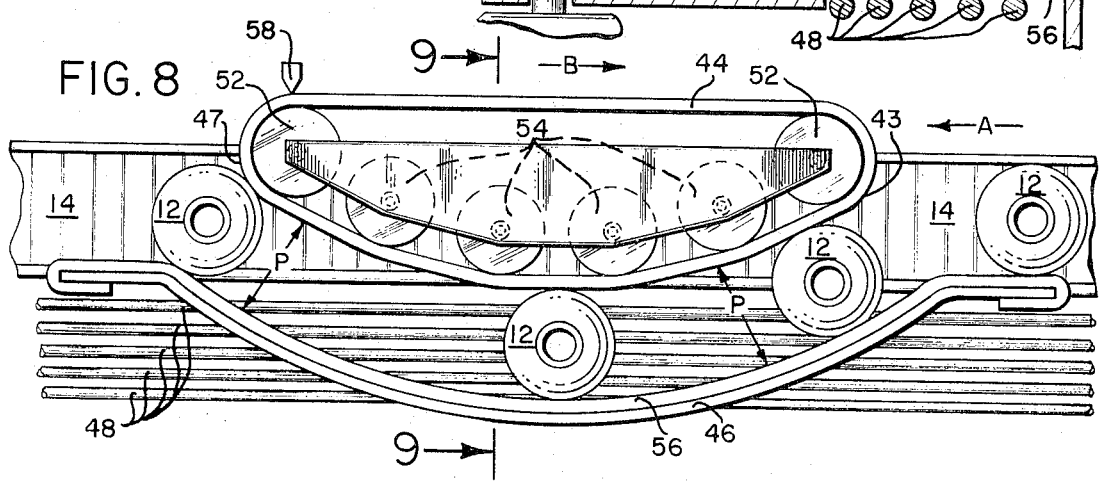
FIG. 8 is a plan view of the container cooling assembly of FIG. 7.

The cooling station includes an endless porous belt 44 which rotates in the direction shown by arrow B in FIG. 8. The endless belt 44 operates in conjunction with side wall 46 to cause the movement and rotation of the containers off the conveyor 14 onto stationary support rods 48. The belt is supported by a plurality of vertically extending rollers 52 and 54. The rollers are rotatably mounted on shafts 51 which are secured to plate 55 and arranged to form an arcuate-shaped belt container contacting surface that extends over the width of the conveyor. Preferably, either one or both of the corner rollers 52 may be power driven to move the belt about the rollers 54 in the direction shown by arrow B.

The end 43 of belt 44 is located angularly over the conveyor to deflect containers moving in the direction shown by arrow A from the conveyor onto the stationary support rods 48. The rods are positioned to be about level with the height of the conveyor. The side wall 46 includes a resilient pad 56 and is spaced apart from the belt a distance about equal to the diameter of the container. When a container reaches end 43 it is deflected into a passageway shown as P in FIG. 8 defined by the area between belt 44 and pad 56. The belt frictionally engages the sides of the container and urges the container into wedging engagement with the resilient pad. This action results in the container movement being controlled by the rotation of the belt rather than the conveyor. As such, the container rotates or rolls about its vertical axis in a counterclockwise direction off the conveyor 14 and through the passageway P.

As the container slides onto the conveyor at end 47, the forward movement of the conveyor takes over control of the container and carries it to other production line operations not a part of the present invention. As the containers slide through passageway P and over the rods 48, nozzles 50 operate to spray water onto the bottoms of the containers. Similarly, water applicator means 58 is utilized to maintain the porous belt 44 in a wet condition so that evaporative water cooling serves to cool all surfaces of the containers as they pass through the cooling station. Such means may be water spray nozzles, a water manifold, or a wet pressure roller continuously contacting the belt.

It is to be noted that in addition to the mechanical simplicity of the sensitizing system of the present invention, the hot flames operate to substantially eliminate abrasion marks, scratches or other minor surface defects that are occasionally found in containers moving rapidly on a high volume assembly line.

What is claimed is:

1. A system for sensitizing the surfaces of containers comprising:
    a conveyor for transporting containers through a system;
    a flame treatment station adjacent said conveyor for heating the container surfaces including a first group of successive upper and lower banks of flame nozzles located along one side of a predetermined length of said conveyor and a second group of corresponding successive upper and lower banks of flame nozzles located on a side of said conveyor opposite said first group with the nozzles of each respective group facing across said conveyor in opposite directions and aligned diagonally with respect to the conveyor centerline; and,
    a cooling station in line with said conveyor and located downstream from said flame treatment station including means to roll the container against a cooling medium.

2. The system of claim 1 including a container sequencing means positioned upstream from the flame treatment station for spacing containers a predetermined distance apart prior to entry into said flame treatment station.

3. The system of claim 1 wherein the flame treatment station includes a series of burners arranged along a predetermined length of said conveyor and aligned to disperse a flame toward the surfaces of a container as it is moved on the conveyor.

4. The system of claim 3 wherein said burners are arranged into banks of two or more burners, said banks being spaced from each other along the conveyor centerline and aligned diagonally thereto.

5. The system of claim 4 wherein said banks are mounted on an elongated slotted frame with a threaded shaft pivotly connecting each bank of burners with said frame, said frame being adjustably mounted on stationary horizontal support bars for the lateral adjustment thereof.

6. The system of claim 1 wherein said conveyor includes a pair of rotate bars positioned on opposite sides thereof and extending at least the length of said flame treatment station.

7. The system of claim 2 wherein the container sequencing means includes an independently rotatable shaft having a circumferential helical-shaped projection for engaging successive containers and spacing them apart a predetermined distance on said conveyor.

8. The system of claim 1 wherein said cooling station includes a porous endless belt supported by rollers and a side wall in juxtaposition therewith to form a passageway for the movement of containers, said cooling station further including water applicator means adjacent said belt for maintaining said belt in a moist condition.

9. The system of claim 8 wherein at least one of said rollers is power driven to cause rotation of said belt thereabout and including spaced apart container support rods positioned about level with and offset from the conveyor, said rollers and belt positioned angularly with respect to the conveyor to deflect a container therefrom onto said rods for movement over the rods a predetermined distance, said cooling station further including means adjacent said rods to apply a cooling medium to the bottom of containers passing thereover.

10. A method of sensitizing the surfaces of a container comprising:
    positioning a container on a conveyor;
    conveying said container through a flame treatment station and subjecting said container to a plurality of successive open flames, said flames directed in opposing directions against the container surfaces; and,
    conveying said container from said flame treatment station to a cooling station, including the step of rolling the container against a cooling medium.

11. The method of claim 10 wherein the container is exposed to said open flames for one to ten seconds.

12. The method of claim 11 including the step of rotating said container about its longitudinal axis during the time it is exposed to said flames.

13. The method of claim 10 wherein said cooling medium is water and including the step of pre-cooling said container prior to contact with said cooling medium.

14. The method of claim 13 wherein the step of rolling the container against a cooling medium comprises the step of frictionally engaging said container between wet porous surfaces wherein at least one of said surfaces moves relative to the other.

* * * * *